UNITED STATES PATENT OFFICE.

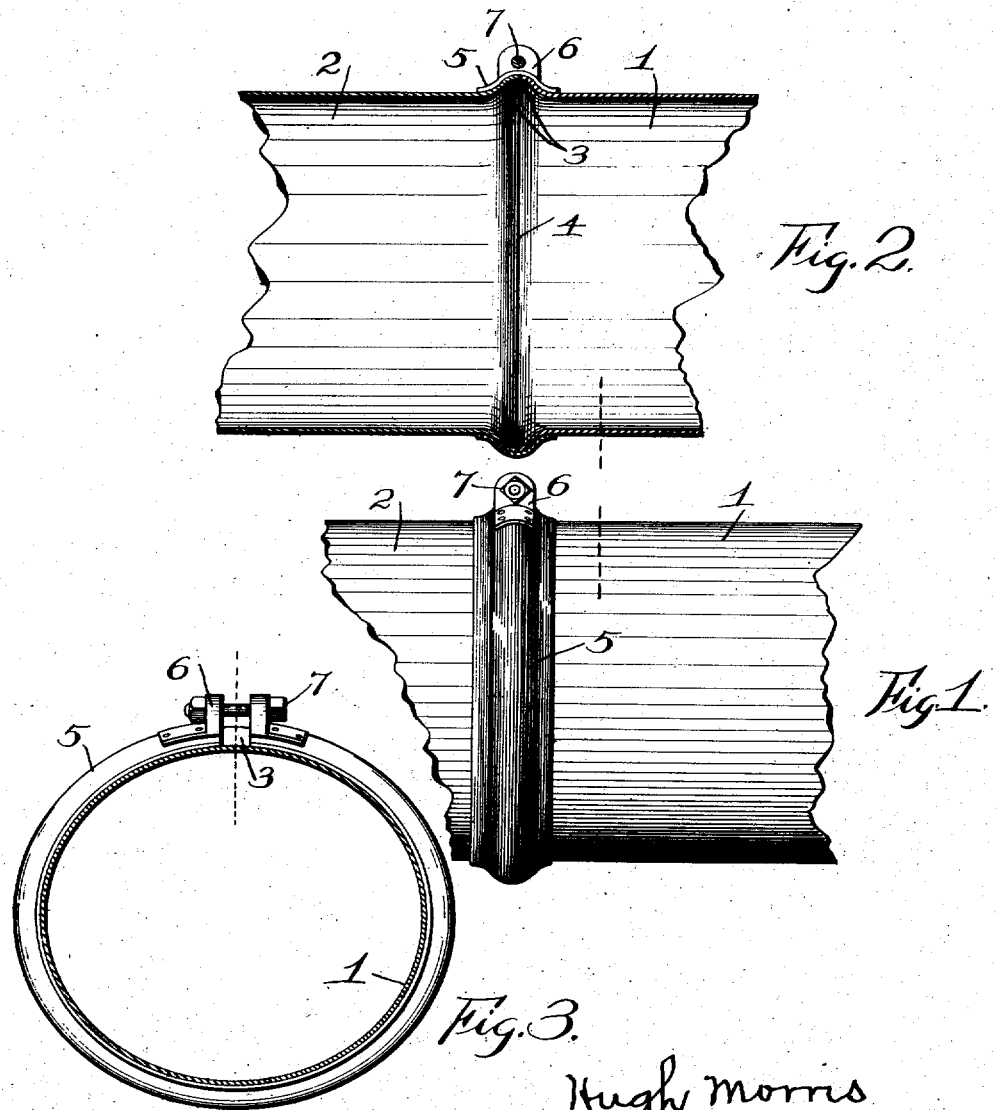

HUGH MORRIS, OF MIDDLETOWN, OHIO.

PIPE-JOINT.

No. 872,442.

Specification of Letters Patent.

Patented Dec. 3, 1907.

Application filed January 19, 1907. Serial No. 353,082.

*To all whom it may concern:*

Be it known that I, HUGH MORRIS, a citizen of the United States, residing at Middletown, Butler county, Ohio, have invented certain new and useful Improvements in Pipe-Joints, of which the following is a specification.

In certain characters of pipe made from comparatively thin sheet metal serious difficulties have presented themselves in forming the joints between pipe sections. Considering a thin pipe as a beam supported at each end its flexure, due to its own weight, may be the well known curve indicative of uniform strain. If the pipe contained, say at mid-point, a joint, it would be desirable that the joint be of precisely the same strength as the body of the pipe in order not to interfere with the uniform disposition of strains. But such a joint is practically impossible of production and the joint will represent either an extra weak or an extra strong point in the length of the pipe. If it is too weak the curve of flexure becomes distorted and strains become concentrated at the joint. If the joint be too stiff then again the curve of flexure becomes distorted and extraordinary strains are brought upon the pipe immediately at each side of the joint and these strains are liable to rupture the pipe at or very near the joint. In pipe made of thick material these matters may be largely ignored owing to the high factor of safety, but in pipe formed of comparatively thin sheet metal the matter becomes important.

My invention is designed to overcome, as far as practicable, the defects referred to and to provide a pipe joint which will be at least as strong as the body of the pipe and will not at the same time become an agent of destruction.

The invention will be readily understood from the following description taken in connection with the accompanying drawing in which:—

Figure 1 is a side elevation of two pipe sections joined upon my improved coupling system: Fig. 2 a vertical longitudinal section of the same: and Fig. 3 a transverse vertical section.

In the drawing:—1, indicates one of the pipe sections: 2, the other pipe section: 3, flaring annular enlargements at the contiguous ends of the pipe sections, these enlargements presenting a reverse curve in cross-section, being exteriorly convex at their greatest diameter and exteriorly concave where the enlargement joins the body of the pipe: 4, the joint between the abutting surfaces of the end enlargements of the two pipe sections: 5, a band of sheet metal surrounding the joint but open circumferentially at one point, this band having a cross-section corresponding with the enlargements on the ends of the pipe sections so that the interior of the band will fairly hug the curves of the exterior of the enlargement of the pipe sections, and bring radial pressure with certainty upon the greatest diameter of the enlargements: 6, ears on the contiguous ends of the band at the circumferential interruption of the band: and 7, a bolt passing through the ears and serving to draw the ends of the band toward each other.

The band need not be very much heavier than the sheet metal of which the pipe is formed, and in any event it should be thin and flexible enough to permit of its being sprung open and applied to the pipe juncture. The band, in being tightened by the bolt, applies radial pressure to the enlargements and at the same time presses the two enlargements toward each other and closes the joint 4 with satisfactory tightness. If, water tightness is desired, then of course, luting or packing might be employed under the band. The joint has a strength which is entirely satisfactory and in practice is found not to bring destructive strains upon the pipe at the joint.

I claim:—

The combination of adjoining pipe sections, the abutting ends of which have annular projecting convexly-curved portions of approximately circular outline in a plane intersecting the longitudinal axis of the pipes, the circular portions mentioned joining the pipe bodies in concave curvatures merging in the projecting portions; a split clamping band encircling the pipe members at the point of intersection and having an interior surface so shaped that when the band is constricted it firmly grips the projecting portions, the greatest pressure being applied to the greatest circumferential part of said projecting portion, and also grips the concave curved portions to a lesser degree; and means for tightening the clamping band.

HUGH MORRIS.

Witnesses:
G. H. CHARLS,
H. STEPHENSON.

DISCLAIMER.

872,442.—*Hugh Morris*, Middletown, Ohio. PIPE JOINT. Patent dated December 3, 1907. Disclaimer filed November 29, 1922, by the patentee.

Hereby enters disclaimer:

"To the combination of elements set forth in the claim of said Letters Patent except when and unless said elements are co-ordinated or used in connection with cylindrical circumferentially corrugated sheet metal culverts or sewer pipe made of comparatively thin sheet metal and adapted to be placed in a horizontal position under the ground for drainage purposes."

[*Official Gazette December 12, 1922.*]

ing the pipe bodies in concave curvatures merging in the projecting portions; a split clamping band encircling the pipe members at the point of intersection and having an interior surface so shaped that when the band is constricted it firmly grips the projecting portions, the greatest pressure being applied to the greatest circumferential part of said projecting portion, and also grips the concave curved portions to a lesser degree; and means for tightening the clamping band.

HUGH MORRIS.

Witnesses:
G. H. CHARLS,
H. STEPHENSON.

DISCLAIMER.

872,442.—*Hugh Morris*, Middletown, Ohio. PIPE JOINT. Patent dated December 3, 1907. Disclaimer filed November 29, 1922, by the patentee.

Hereby enters disclaimer:

"To the combination of elements set forth in the claim of said Letters Patent except when and unless said elements are co-ordinated or used in connection with cylindrical circumferentially corrugated sheet metal culverts or sewer pipe made of comparatively thin sheet metal and adapted to be placed in a horizontal position under the ground for drainage purposes."

[*Official Gazette December 12, 1922.*]

DISCLAIMER.

872,442.—*Hugh Morris*, Middletown, Ohio. PIPE JOINT. Patent dated December 3, 1907. Disclaimer filed November 29, 1922, by the patentee.

Hereby enters disclaimer:

"To the combination of elements set forth in the claim of said Letters Patent except when and unless said elements are co-ordinated or used in connection with cylindrical circumferentially corrugated sheet metal culverts or sewer pipe made of comparatively thin sheet metal and adapted to be placed in a horizontal position under the ground for drainage purposes."

[*Official Gazette December 12, 1922.*]